(12) United States Patent
Holemans

(10) Patent No.: US 7,861,976 B2
(45) Date of Patent: Jan. 4, 2011

(54) LATCHING SEPARATION SYSTEM

(75) Inventor: Walter Holemans, Silver Springs, MD (US)

(73) Assignee: Planetary Systems Corporation, Silver Spring, MD (US)

( * ) Notice: Subject to any disclaimer, the term of this patent is extended or adjusted under 35 U.S.C. 154(b) by 0 days.

(21) Appl. No.: 12/471,503

(22) Filed: May 26, 2009

(65) Prior Publication Data

US 2010/0090066 A1    Apr. 15, 2010

Related U.S. Application Data

(62) Division of application No. 11/070,343, filed on Mar. 2, 2005, now abandoned.

(60) Provisional application No. 60/555,663, filed on Mar. 23, 2004, provisional application No. 60/619,805, filed on Oct. 18, 2004.

(51) Int. Cl.
*B64G 1/00* (2006.01)
*E05C 3/06* (2006.01)

(52) U.S. Cl. .............. 244/173.3; 244/172.9; 244/137.4; 244/131; 244/119; 292/199

(58) Field of Classification Search .............. 244/159.4, 244/23 D, 172.4, 172.6, 172.9, 173.1–173.3, 244/131, 119, 120; 292/16, 24, 102, 103, 292/201, 44, 50, 54, 96, 101, 108, 195, 202, 292/210, 304, 25–31, 45, 56, 51, 95, 112, 292/203, 199, 280; 285/80, 82; 294/82.24, 294/82.26, 82.3, 82.31, 82.32, 82.33, 81.56, 294/82.29; 27/2, 17; 102/293, 377
See application file for complete search history.

(56) References Cited

U.S. PATENT DOCUMENTS

| 259,601 | A | 6/1882 | Swanson ..................... 292/30 |
|---|---|---|---|
| 865,498 | A | 9/1907 | Kenyon |
| 1,070,365 | A | 8/1913 | Voight .......................... 292/47 |
| 1,472,908 | A | 11/1923 | Hart ........................ 105/308.2 |
| 2,049,373 | A | 7/1936 | Hampe ........................ 292/31 |
| 2,159,150 | A | 5/1939 | Heintz |
| 2,274,711 | A | 3/1942 | Krause ......................... 292/99 |
| 2,278,482 | A | 4/1942 | Pishvanov .................. 89/1.58 |
| 2,296,360 | A | 9/1942 | Markey ...................... 89/1.58 |
| 2,631,032 | A | 3/1953 | Denker et al. ................. 49/278 |
| 2,708,301 | A | 5/1955 | Wilkirson ......................... 27/2 |
| 2,708,302 | A | 5/1955 | Wilkirson ......................... 27/2 |
| 2,753,613 | A | 7/1956 | Baker, Jr. ......................... 27/17 |
| 2,809,557 | A | 10/1957 | Johnson ..................... 89/1.58 |
| 2,822,207 | A | 2/1958 | Steinmetz et al. ......... 294/82.26 |
| 2,916,317 | A | 12/1959 | Diday ........................... 292/26 |
| 2,941,442 | A | 6/1960 | Buschers .................... 89/1.51 |

(Continued)

FOREIGN PATENT DOCUMENTS

CH    671263 A5    8/1989

*Primary Examiner*—Joshua J Michener
(74) *Attorney, Agent, or Firm*—Robert M. McDermott, Esq.

(57) ABSTRACT

Latching elements on a first structure are configured to securely engage corresponding bearings on a second structure, via a lateral member that drives all of the latching elements simultaneously. When engaged, or when disengaged, the system is in a stable state, requiring no active force by the controlling system to maintain the system in each state. Preferably, each latching element is coupled to the lateral member via a pinion that provides a mechanical advantage that substantially reduces the force required on the lateral member to effect the coupling or decoupling. Also preferably, the elements are formed from extruded aluminum forms, thereby providing for a relatively inexpensive and lightweight configuration that is particularly well suited for spacecraft applications.

20 Claims, 4 Drawing Sheets

U.S. PATENT DOCUMENTS

| | | | |
|---|---|---|---|
| 2,956,477 A | 10/1960 | Barr et al. | 89/1.51 |
| 2,963,312 A | 12/1960 | Schenk et al. | 294/82.26 |
| 3,036,852 A | 5/1962 | Mullison | 294/82.26 |
| 3,056,623 A | 10/1962 | Herbert | 294/82.26 |
| 3,420,470 A | 1/1969 | Meyer | |
| 3,424,403 A | 1/1969 | Hull | |
| 3,578,368 A | 5/1971 | Dupuis | 292/45 |
| 3,586,360 A | 6/1971 | Perrotta | 292/26 |
| 3,722,944 A | 3/1973 | Dand | 294/82.26 |
| 3,737,117 A | 6/1973 | Belew | 244/172.4 |
| 3,744,829 A | 7/1973 | Germer | 292/22 |
| 3,753,536 A | 8/1973 | White | 244/172.5 |
| 4,095,829 A | 6/1978 | Van Klompenburg | 292/241 |
| 4,135,377 A | 1/1979 | Kleefeldt et al. | 70/264 |
| 4,183,480 A | 1/1980 | Jakubowski, Jr. | 244/137.4 |
| 4,202,576 A | 5/1980 | Hasquenoph et al. | 294/82.26 |
| 4,273,368 A | 6/1981 | Tanaka | 292/53 |
| 4,313,582 A | 2/1982 | Hasquenoph et al. | 244/137.4 |
| 4,318,561 A | 3/1982 | Hasquenoph et al. | 294/82.26 |
| 4,364,249 A | 12/1982 | Kleefeldt | 70/264 |
| 4,381,583 A | 5/1983 | von Tiesenhausen | |
| 4,540,873 A | 9/1985 | Kester | |
| 4,685,376 A | 8/1987 | Noel et al. | |
| 4,715,565 A | 12/1987 | Wittmann | |
| 4,790,571 A | 12/1988 | Montanari et al. | |
| 4,898,409 A | 2/1990 | Carter | 292/31 |
| 4,905,938 A | 3/1990 | Braccio et al. | 244/101 |
| 4,929,009 A | 5/1990 | Vandersluis et al. | 294/2 |
| 4,984,833 A | 1/1991 | Knurr | 292/96 |
| 5,018,772 A | 5/1991 | Obermeyer et al. | 292/39 |
| 5,058,939 A | 10/1991 | Miilu | 292/110 |
| 5,125,601 A | 6/1992 | Monford | |
| 5,145,130 A | 9/1992 | Purves | 244/159.4 |
| 5,180,198 A | 1/1993 | Nakamura et al. | 292/201 |
| 5,197,695 A | 3/1993 | Anderson et al. | |
| 5,385,387 A | 1/1995 | Kain | 297/256.16 |
| 5,390,606 A | 2/1995 | Harris | |
| 5,735,626 A | 4/1998 | Khatiblou et al. | |
| 6,161,881 A | 12/2000 | Babka et al. | 292/26 |
| 6,227,493 B1 | 5/2001 | Holemans | |
| 6,290,275 B1 | 9/2001 | Braam et al. | 294/86.4 |
| 6,343,770 B2 | 2/2002 | Holemans | |
| 6,390,416 B2 | 5/2002 | Holemans | |
| 6,502,868 B1 | 1/2003 | Laspa et al. | 292/26 |
| 6,672,646 B2 | 1/2004 | Obendiek | 296/121 |
| 6,688,656 B1 | 2/2004 | Becken | 292/26 |
| 6,802,543 B1 | 10/2004 | Wakefield | 292/48 |
| 6,871,451 B2 | 3/2005 | Harger et al. | 49/449 |
| 6,981,724 B2 | 1/2006 | Denys | 292/64 |
| 7,040,671 B2 | 5/2006 | Su et al. | 292/24 |
| 2002/0185887 A1 | 12/2002 | Hasselgruber et al. | 296/121 |
| 2005/0279890 A1* | 12/2005 | Holemans | 244/171.3 |

* cited by examiner

LATCHING SEPARATION SYSTEM

This application is a Divisional application of U.S. patent application Ser. No. 11/070,343, filed 2 Mar. 2005 now abandoned, and claims the benefit of U.S. Provisional Patent Application 60/555,663, filed 23 Mar. 2004, and U.S. Provisional Patent Application 60/619,805, filed 18 Oct. 2004.

BACKGROUND AND SUMMARY OF THE INVENTION

This invention relates to the field of mechanical connectors, and in particular to a connector that is suitable for coupling large objects, such as spacecraft to launch vehicles.

Transport systems, such as rockets that transport satellites into space, vessels that transport submerged sections of ocean structures such as oil platforms, and the like, require a means for securely fastening different items together for transport, and reliably and easily unfastening the items for deployment. Multi-stage rockets also require a means for fastening the stages together, and reliably unfastening the stages as each stage is spent. In other situations, such as aircraft carrier based aircraft, the items are transported or stored in a disassembled state and require a means for rapidly fastening the items for deployment, and reliably and easily unfastening the items for subsequent storage or transport.

A variety of devices have been developed to secure two items together while also allowing the items to be separated quickly and reliably. In the aerospace industry, the common connection devices include bolts and bands that can be severed. Bolts are used to fasten the two items together, and an explosive charge is typically used to sever the bolts at the proper time, thereby unfastening the two items. Depending upon the application, ancillary devices such as springs may be used to urge the two items apart when the bolts are severed. To assure a reliable separation, the number of bolts used to fasten the two items is kept to a minimum; this results in load points at the bolts far in excess of the load imposed by a distributed fastening system.

Belt structures are commonly used to provide for a distributed load. A belt structure that is commonly employed to fasten items together is a "V-band", typified by U.S. Pat. No. 4,715,565, "CLAMPING CONNECTION ASSEMBLY FOR SPACECRAFT", issued 29 Dec. 1987 to Alois Wittmann, and incorporated by reference herein. The V-band includes a tension belt for securing a plurality of retainers against camming surfaces on flange members on separable spacecraft component parts. A typical V-band embodiment consists of an upper ring attached to the payload, a lower ring attached to the launch vehicle, and a clampband that is circumferentially tensioned to the flanges of the upper and lower rings. The clampband is conventionally tensioned by bolts, and explosive bolt cutters are used to sever the bolts to release the tension. Because of the high tension requirements, the combined weight of the belt, clamps, and ancillary required devices is substantial (as much as 45 pounds for a 38 inch diameter V-band structure). The high tension requirements of V-bands often require specialized tools and instruments to tension the band. The high tension and high release shock effects also limits the reliable life of the components, thereby limiting the amount of testing that can be applied to the components that are actually flown.

Another structure that is commonly used to provide for an easily separable connection is an explosive frangible joint, as typified by U.S. Pat. Nos. 4,685,376 and 5,390,606. The explosive frangible joint is commonly used in lieu of the aforementioned V-band for large diameter structures, typically greater than 30 inches. An explosive detonating cord is placed within a contained space that forms the frangible joint between the two items. Separation is achieved by detonating the cord within the contained space, forcing a rapid crack propagation through the frangible joint. Although the weight of an explosive frangible joint is less than that of an equivalent sized V-band, it is still substantial (as much as 17 pounds for a 38 inch diameter joint). The destructive nature of this separation system precludes testing of the joints that are actually flown. Many launched vehicles have been lost due to a failure in the explosive separation system, and many satellites have been damaged due to explosive shock.

Each of the aforementioned separation connectors also imparts a substantial shock to the connected items upon separation, and the explosive nature of the devices used for separation introduce a risk of personal injury, particularly during pre-launch assembly and testing. Because of the shock effects, such separation connectors are not commonly used on items that are routinely disassembled for storage or transport, and explosive joints are not commonly used on fragile devices, such as spacecraft/satellites.

A lighter, non-explosive, and reusable coupling system is disclosed in U.S. Pat. No. 6,227,493, "REUSABLE, SEPARABLE, STRUCTURAL CONNECTOR ASSEMBLY", and its continuation-in-part, U.S. Pat. No. 6,343,770, issued 8 May 2001 and 5 Feb. 2002, respectively, to Walter Holemans; each of which are incorporated by reference herein. This reusable coupling system employs a plurality of leaves with leaf lips that are secured within a mating surface by a band. The leaves and mating surface are designed such that the tension required on the band is significantly less than the tension required on a V-band. When the band is detensioned, springs urge the leaves away from the mating surface, thereby allowing for the separation of the connected items. The leaf lips can be configured to face toward an interior of a perimeter, and the band is contracted to hold the lips against an interior mating surface; or, the leaf lips can be configured to face toward an exterior of a perimeter, and the band is expanded to hold the lips against an exterior mating surface.

Although this coupling system overcomes most of the limitations of former systems, and particularly the limitations of explosive systems, it relies upon exerting a radial force, either outward or inward, about a substantially continuous perimeter of leaf lips. Additional means, such as spring elements, are also provided to assure that the leaf lips are disengaged from the mating surface.

It is an object of this invention to provide a non-explosive and reusable coupling system that provides for substantially bistable operation. It is a further object of this invention to provide a non-explosive and reusable coupling system that integrates both the coupling and decoupling means. It is a further object of this invention to provide a non-explosive and reusable coupling system that does not require exerting a radial force. It is a further object of this invention to provide a non-explosive and reusable coupling system that does not require a continuous perimeter of engaging elements.

These objects, and others, are achieved by a coupling system that includes latching elements on a first structure that are configured to securely engage corresponding bearings on a second structure. When engaged, or when disengaged, the system is in a stable state, requiring no active force by the controlling system to maintain the system in each state. The coupling system includes a pair of coupling elements, one of which includes a plurality of latching elements, and the other of which includes a plurality of corresponding bearings. A lateral member provides simultaneous rotation of the plurality of latching elements to engage, or disengage, the latching elements from the bearings. Preferably, each latching element is coupled to the lateral member via a pinion that provides a mechanical advantage that substantially reduces the force required on the lateral member to effect the coupling or decoupling. Also preferably, the elements are formed from extruded aluminum forms, thereby providing for a relatively inexpensive and lightweight configuration.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes, are not drawn to scale, and are not intended to limit the scope of the invention.

DETAILED DESCRIPTION OF THE INVENTION

The invention is presented herein using the paradigm of a spacecraft separation system, because some of the features and benefits of this invention are particularly well suited for coupling, and decoupling, spacecraft. One of ordinary skill in the art will recognize, however, that the disclosed coupling system is not limited to spacecraft applications. Of particular note, this invention is well suited for coupling large structures or large components. In space applications, the coupling system of this invention can be used to facilitate the coupling of the components of space stations, or components of habitats that must provide sealed environments on other planets or moons. In terrestrial applications, the coupling system of this invention can facilitate the joining of pipes in difficult environments, such as the artic or open-water oil platforms; similarly, the building of habitats in these environments can be facilitated by coupling preformed structures. Other applications include the sealing of large openings, such as cargo doors on ships, trucks, trains, and planes, warehouse loading docks, watertight compartments on ships, and so on.

Figure 1A:
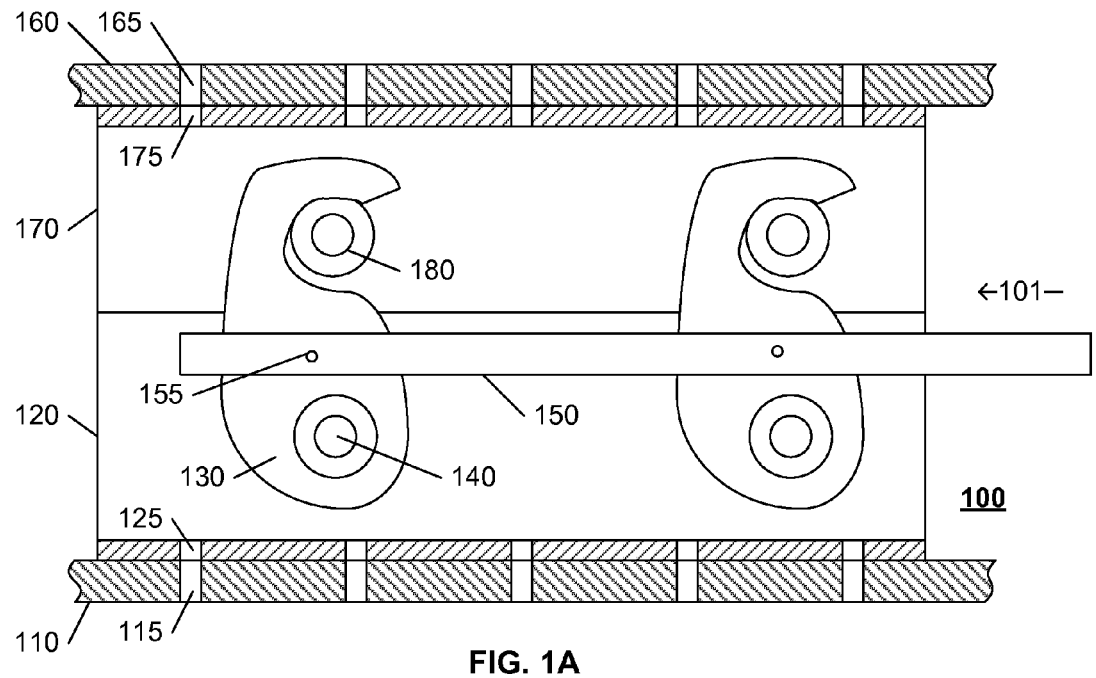
FIGS. 1A-1B illustrate an example latching coupling/separation system in accordance with this invention.
Figure 1B:
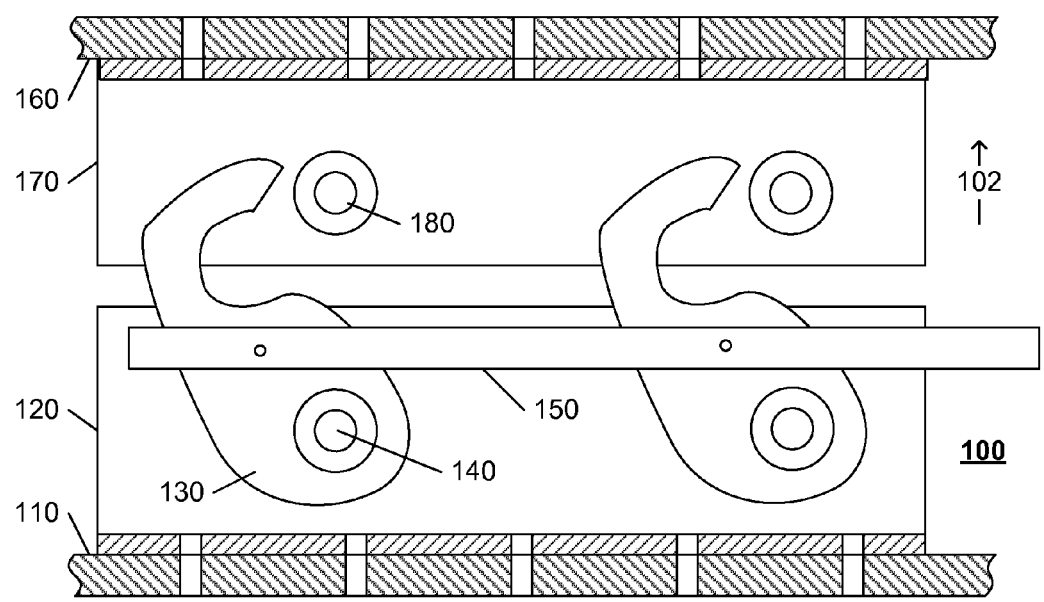
Figures 2A, 2B, 2C, 7:
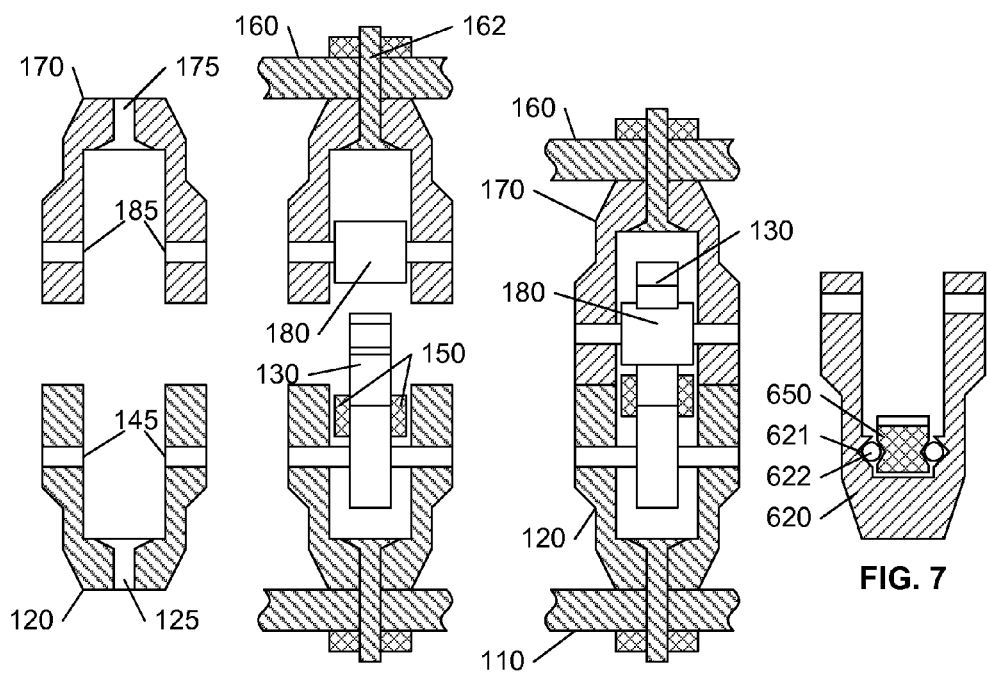
FIGS. 2A-2C illustrate mechanical details of an example latching coupling/separation system in accordance with this invention.
FIG. 7 illustrates a mechanical detail of the other example latching coupling/separation system in accordance with this invention.

FIGS. 1A-1B illustrate an example coupling system 100 in accordance with this invention, and FIGS. 2A-2C provide cross-section views that illustrate additional mechanical details. The example system 100 is presented as a linear coupling system, for ease of understanding, although curved coupling systems are also feasible, as discussed further below with regard to FIG. 5.

Figure 3:
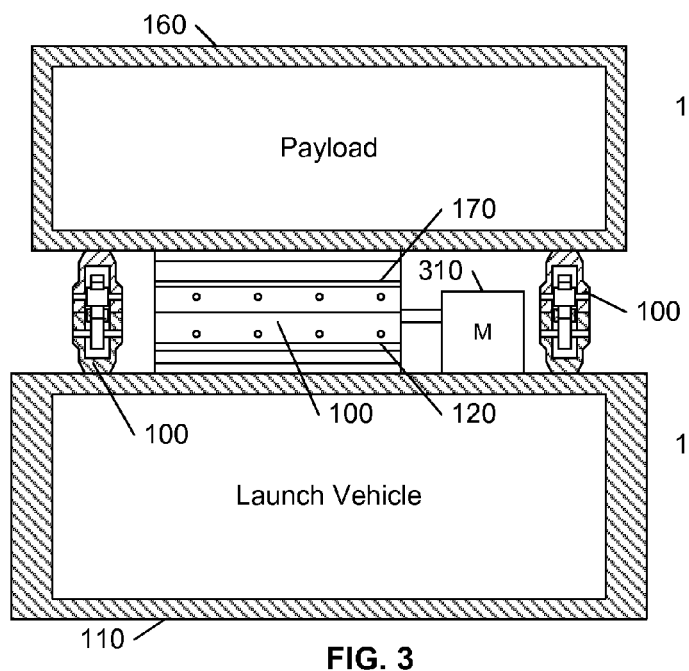
FIG. 3 illustrates an example use of a latching coupling/separation system for a spacecraft system in accordance with this invention.

The coupling system 100 includes a lower structure 120 that includes a plurality of latches 130, and an upper structure 170 that includes a plurality of corresponding bearings 180. These structures 120, 170 are configured to be attached to the components 110, 160 that are to be coupled together, such as a spacecraft and launch vehicle, as illustrated in FIG. 3. In an example embodiment, holes 115, 125 and 165, 175 are provided to allow the structures 120, 170 to be bolted (162 in FIG. 2B) to the components 110, 160.

Two latches 130 and corresponding bearings 180 are illustrated in FIGS. 1A-1B, but in view of this disclosure, one of ordinary skill in the art will recognize that the number of latches and bearings used will typically be determined by the size and structure of the components being coupled. In a typical embodiment, the latches 130 are about two inches high, and are spaced approximately two inches apart. Structures 120, 170 of a few feet long are not uncommon, and would include dozens of latches 130 and bearings 180.

Each latch 130 is configured to rotate about a bearing 140, to engage (FIGS. 1A, 2C) or disengage (FIGS. 1B, 2B) the latch 130 with its corresponding bearing 180. A lateral member 150 is coupled (pin 155 in FIG. 1A) to each latch 130, to provide a synchronized rotation of all of the latches to effect the engagement or disengagement, via a substantially lateral movement 101. As illustrated in FIG. 2B, a pair of lateral members 150 may be used to avoid unwanted torque, particularly in an application that uses dozens of latches 130.

Preferably, the bearings 140 and 180 are aligned so that when the latch 130 and bearing 180 are in the latched position, counter-clockwise rotational forces (unlatching forces) are not present on the latch 130. That is, when the latch 130 and the bearing 180 are engaged, there are preferably no shear forces on structures 170 and 120. Further, when the latch 130 and bearing 180 are engaged, the system is in an energy trough, and substantial shear forces would be required to disengage the latch 130 and bearing 180. The shape of the latch 130 and the location of the pin 155 may also be configured to avoid unlatching forces when the latch 130 is in the latched position. Additionally, the outer surface of the bearing 180 preferably includes a deformable material, such as nylon, and the hook section of the latch 130 includes a substantially non-deformable material, such as steel, and the dimensions are such that the latch 130 and bearing 180 are under tension in the latched position. In this manner, the latched position is a highly stable position, and the latch remains latched without the need to continuously provide an external force. That is, the lateral member 150 is not required to continuously apply a rotational force after the latch 130 and bearing 180 achieve this stable latched state.

As illustrated in FIG. 2C, in the latched state, the elements 120 and 170 provide coincident bearing surfaces, which are preferably also held in compression by the tension-configuration of the latch 130 and bearing 180. Although the bearing surfaces are illustrated as being flat, one of ordinary skill in the art will recognize that these surfaces can be contoured to facilitate and maintain alignment. In like manner, these surfaces may include complementary details along the lateral span of the structures 120, 170, to facilitate alignment of the latches 130 and bearings 180 as the structures are being coupled.

As can be seen in these illustrations, a preferred embodiment of this invention provides a substantially self-aligning coupling system, in that once the structures 120, 170 are brought close enough together to allow the latch 130 to engage the bearing 180, the lateral movement of the member 150 serves to vertically align the bearings 180, 140. Other methods of aligning the structures 120, 170 as the latch 130 engages the bearing 180, such as shaping of the adjoining surfaces will be evident to one of ordinary skill in the art. This self-alignment is particularly advantageous for coupling large structures, such as the aforementioned space and terrestrial based habitat structures, large pipes and doors, and so on. In a space environment, where gravity cannot be relied upon to bring components together, this self-alignment is particularly advantageous. In a terrestrial environment, where gravity often makes fine alignment difficult, this self-alignment is also particularly advantageous.

Application of a force on the lateral member in the direction 101 of FIG. 1A effects a decoupling of the latch 130 and bearing 180, as illustrated in FIG. 1B, allowing a separation 102 of the component 160 from the component 110. The latch 130 and lateral member 150 are configured such that in the unlatched state, there are no clockwise rotational forces (latching forces) acting on the latch 130, thereby providing a stable unlatched state. Additional elements may be provided to further retain the latch 130 in the unlatched state, using techniques common in the art, such as friction or detent features.

In a preferred embodiment of this invention, the structures 120, 170 are formed of extruded aluminum, and are cut-to-size for the given application. As illustrated in the cross-section views of FIGS. 2A-2C, holes 145, 185, 125, 175 are bored as required for containing the bearings 140, 180 between the side walls of the structure, and for coupling the structures 120, 170 to the components 110, 160. Although the holes are illustrated as lying in a common plane in FIGS. 2A-2C, for ease of illustration, one of ordinary skill in the art will recognize that the holes 125, 175 need only correspond to holes 115, 165 in the components 110, 160 (see FIG. 1), and can be independent of each other, and independent of the location of the bearing holes 145, 185.

FIG. 3 illustrates an example use of a latching coupling/separation system for a spacecraft system in accordance with this invention. In this example, three coupling systems 100 are illustrated, two in cross section, and one in profile. The profile illustration indicates that this example system 100 includes four latches and corresponding bearings, and a motor 310 that is configured to provide the lateral force to rotate the latches. Optionally, an additional motor may also be provided, at the opposite end of the system 100, for redundancy, or to share the load.

Figure 4:
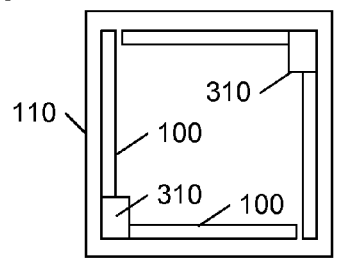
FIGS. 4 and 5 illustrate example configurations of a latching coupling/separation system in accordance with this invention.

FIG. 4 illustrates another example configuration, wherein each of a pair of motors 310 provides the lateral force to a pair of coupling systems 100. This example illustrates a rectangular configuration of four coupling systems 100, although other combinations of systems 100 would be apparent to one of ordinary skill in the art in view of this disclosure.

Figure 5:
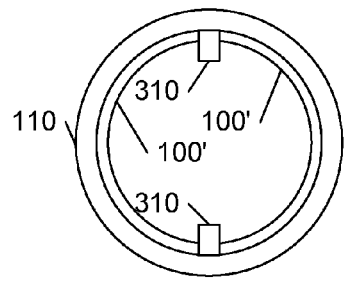

FIG. 5 illustrates a circular configuration of a latching coupling/separation system in accordance with this invention, which is particularly well suited for large-diameter (e.g. a few feet or more) configurations, such as commonly used for missile staging and fairing release. A circular configuration provides uniform coupling forces, and facilitates the use of an O-ring for configurations that require a substantial seal. A circular configuration also allows for the use of a single motor 310, although dual motors, as illustrated, are preferred for redundancy and/or load-sharing. A large-diameter configuration facilitates the use of extruded-then-rolled aluminum forms for the structures 120, 150, 170, (FIG. 1) for a cost-effective embodiment.

The particular configuration of the plurality of latches 130 illustrated in FIGS. 1-3 is provided for ease of understanding of the principles of this invention, and is not intended to limit the scope of the claims. One of ordinary skill in the art will recognize that a variety of configurations may be used to embody the principles of this invention.

Figure 6A:
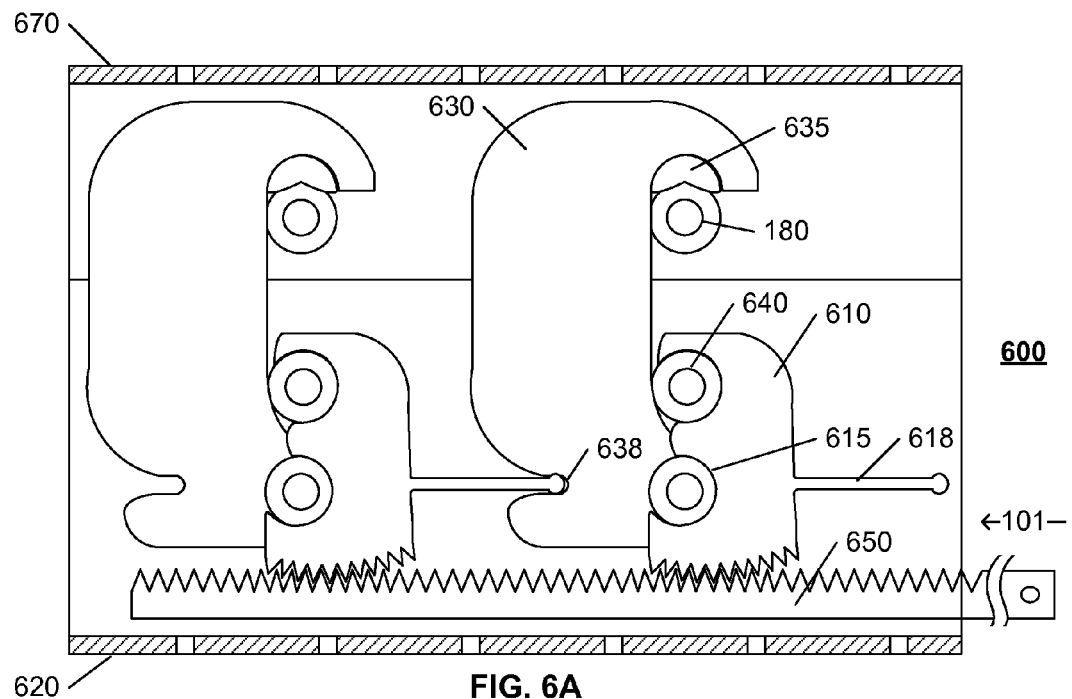
FIGS. 6A-6B illustrate another example latching coupling/separation system in accordance with this invention, wherein pinions are used to provide mechanical advantage.
Figure 6B:
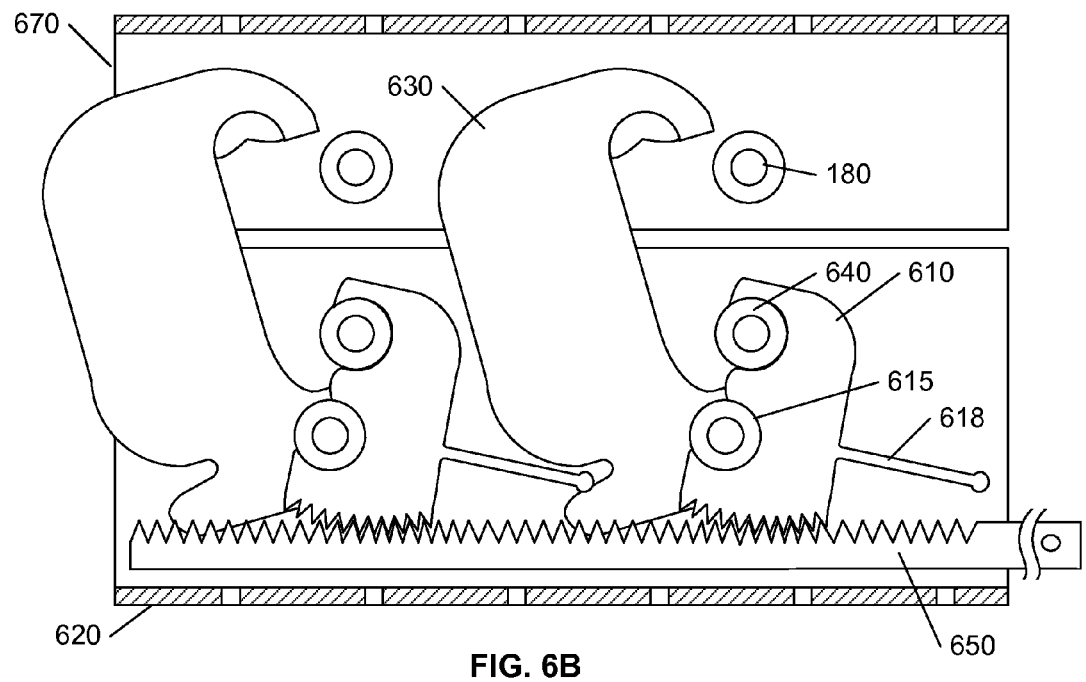

An example alternative configuration that is particularly well suited for a high-reliability application with minimal latching/unlatching force requirements is illustrated in FIGS. 6A-6B.

Of particular note, this configuration 600 uses a pinion 610 that couples a lateral member 650 to a latch element 630. This pinion 610 provides mechanical advantage to allow latching and unlatching with reduced force on the lateral member 650. The pinion 610 is configured to rotate about a bearing 640 that is fixed to the lower structure 620, and is coupled to the latch 630 by a bearing 615 that is not attached to the structure 620. The lateral member 650 and the pinion 610 are preferably coupled via a gear-tooth arrangement, as illustrated, although other forms of coupling may be used. In a preferred embodiment, the pinion 610 also includes a tang 618 that facilitates the latching and unlatching of an adjacent latch by applying a pivoting and rotating force to the adjacent latch.

When a lateral force is applied in the direction 101 by the lateral member 650, to unlatch the latches 630, the pinion 610 rotates clockwise about the fixed bearing 640, and forces the bearing 615 to move in a clockwise direction. In conjunction with the tang 618 of an adjacent pinion that provides a pivoting point at 638, the clockwise movement of the bearing 615 causes the latch 630 to move upward and counter-clockwise. The levered downward movement of the tang 618 of the adjacent pinion also applies a force that urges the latch 630 in a counter-clockwise direction. The upward and counter-clockwise rotation of the latch 630 releases it from the bearing 180, and the upper structure 670 is free to separate from the lower structure 620, as illustrated in FIG. 6B.

The tang 618 of the pinion also serves to hold the adjacent latch 630 in the unlatched position until the lateral member 650 is moved to the right, to place the latch 630 in the latched position of FIG. 6A. The lateral movement to the right causes the pinion 610 to rotate counter-clockwise, the tang 618 to rise, the combination of which causes the latch 630 to rotate clockwise. As the latch 630 approaches the latched position, continued rotation of the pinion 610 causes a downward and clockwise force to be applied to the latch 630, securing it against the deformable outer surface of the bearing 180, and locking the latch 630 and the bearing 180 under tension in a highly stable state.

Preferably, the latch 630 comprises a lightweight and inexpensive material, such as aluminum. To assure that the latched tension against the bearing 180 does not deform the hook end of the latch 630, a less deformable material, such as steel, is used as an insert 635 in the hooked end of the latch 630. Preferably, the insert 635 is shaped to further provide stability to the latched state, for example, using the "tooth" shape illustrated in FIGS. 6A-6B, that serves to align the insert 630 above the center-line of the bearing 180.

The lower 620 and upper 670 structures of the example coupling system 600 are configured similar to the structures 120, 170 of the example coupling system 100, previously discussed. To provide for a lightweight and inexpensive embodiment, these structures 620, 670, as well as the lateral member 650, are preferably formed from extruded aluminum. FIG. 7 illustrates a preferred arrangement of the lower structure 620 and the lateral member 650, wherein the structure 620 is formed to include a track 621 within which the lateral member 650 rides, to restrict the member 650 to lateral movements along the length of the structure 620. Preferably, ball bearings 622 are used to facilitate the lateral movement of the member 650. These extruded forms 620, 650, 670 can also be rolled to formed a curved latching system, such as illustrated in FIG. 5, and discussed above, and the track 621 in the rolled form 620 further facilitates the desired curved travel of the lateral member 650.

The latches 630 and pinions 610 can also be "sliced" from extruded aluminum forms, to further reduce the cost of the coupling system 610. In a preferred embodiment, the latches 630 and pinions 610 are formed to be almost as thick as the space between the walls of the structure 620, to provide maximum strength and to minimize movements. To allow both the latch 630 and the pinion 610 to be this same thickness, the latch 630 and pinion 610 are suitably milled so that one is sandwiched between the other in the region where they overlay at the bearing 615. Other techniques for interleaving mechanical elements are well known in the art, including the use of layered structures.

Figure 8A:
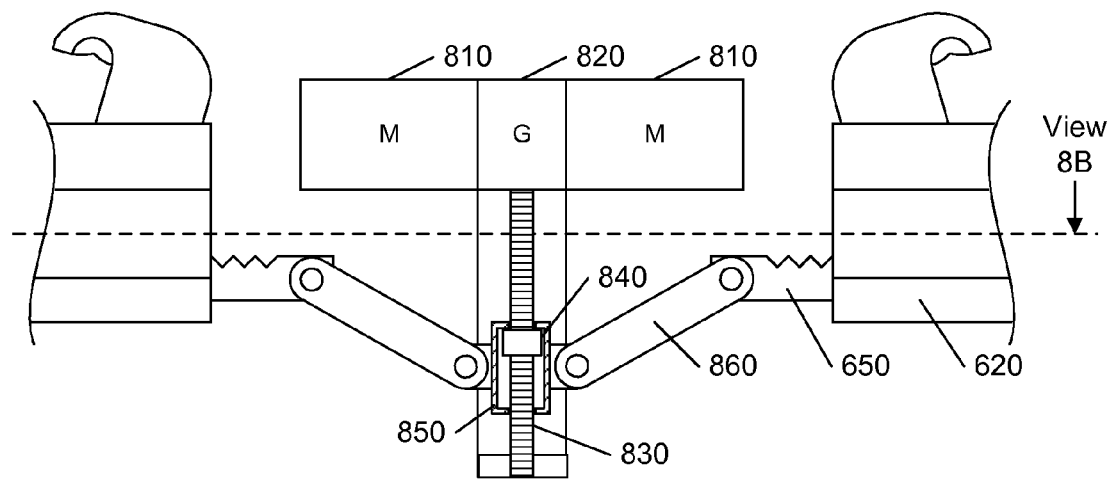
FIGS. 8A-8B illustrate an example motor assembly for driving the latching coupling/separation system in accordance with this invention.
Figure 8B:
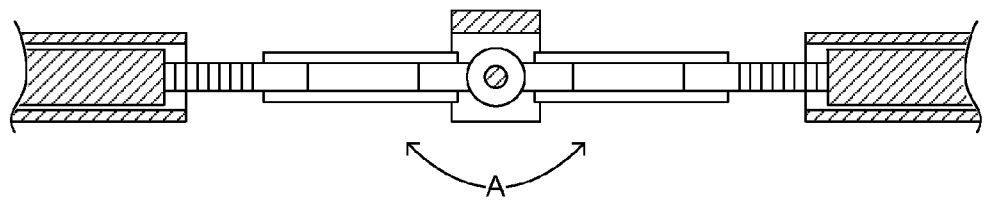

FIGS. 8A-8B show an example embodiment of a motor assembly that is particularly well suited for driving the coupling systems 100, 600 of this invention. Coupling system 600 is illustrated in FIGS. 8A-8B. FIG. 8A illustrates a profile view, and FIG. 8B illustrates a cross section view.

By turning a ball screw 830, a ball nut 840 is driven up or down, and this ball nut 840 drives a tube 850 correspondingly up or down. Link elements 860 couple the tube 850 to the lateral element 650, to effect a latching-travel of the element 650 when the tube 850 moves upward, and an unlatching-travel of the element 650 when the tube 850 moves downward. Preferably, the assembly 840-850 is located on the screw 830 such that when the link elements 860 approach their maximum extent, in line with the lateral element 650, the system 600 is driven to its latched state. The arrangement of the ball nut 840 and the larger sliding tube 850 allows the motor assembly to act as a "snap-action" device as the link assembly passes its maximum extent and the link elements 860 are "overcentered", by about two degrees. Upon snapping into position, the lateral force thereafter provided by the motor assembly is minimal.

Two motor units 810 are illustrated for driving a gear arrangement 820 to turn the ball screw 830, to provide redundancy and/or load-sharing, although one motor unit 810 could be used, with or without a gear arrangement 820.

This motor assembly is also well suited for driving multiple coupling systems, as illustrated in FIGS. 8A-8B. Although the assembly is illustrated as driving two coupling systems displaced at an angle A of 180° in FIG. 8B, the ball nut assembly 840 can be configured to support link elements 860 at different angles, and/or to support additional link elements. For example, a "star" configuration can be used to drive multiple coupling systems that are arranged radially about a central motor assembly.

Figure 9:
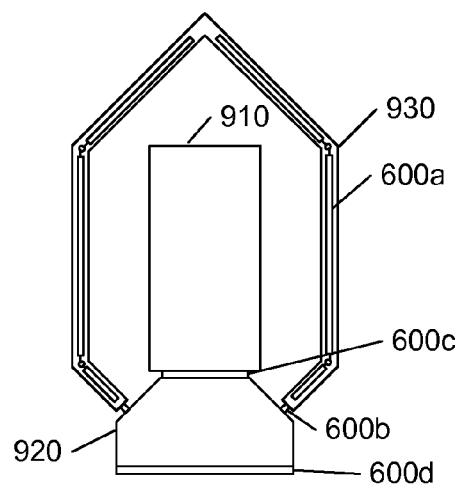
FIG. 9 illustrates example uses of a latching coupling/separation system for a spacecraft system in accordance with this invention.

FIG. 9 illustrates example uses of the coupling system of this invention for a typical spacecraft application. The example spacecraft includes a payload comprising a primary section 910, such as a satellite, and a secondary section 920, such as an orbit transfer vehicle, and a fairing comprising two fairing halves 930 (one of which is shown). Coupling system 600a is used to couple the fairing halves 930, and comprises multiple linear segments. Coupling system 600b is used to couple the fairing to the payload section 920, and comprises two semi-circular segments. Coupling system 600c is used to couple the primary 910 and secondary 920 sections of the payload, and coupling system 600d is used to couple the payload section 920 to the launch vehicle (not shown), each of which comprises a circular segment, such as illustrated in FIG. 5.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims. For example, as noted above, the components 110, 160 of the example embodiments of FIGS. 1A-B, 2A-C, 3, 4, and 5, can be a spacecraft and a launch vehicle, two stages of a launch vehicle, etc., and one of skill in the art will recognize that these components 110, 160 may also comprise any two components that are separably coupled together, such as two components of a space station, two components of a habitat, two lengths of pipe, two sections of a fuselage, a cargo container and access door, and so on.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

The invention claimed is:

1. A coupling device for coupling a first element to a second element, comprising:
  a first structure that is configured to be attached to the first element, and includes a plurality of transverse-mounted bearings;
  a second structure that is configured to be attached to the second element, and includes:
    a plurality of latch elements that are configured to engage the plurality of bearings via a rotation of the latch elements,
    a lateral member that is configured to provide the rotation of the latch elements via a lateral movement of the lateral member, and
    a plurality of pinions that are each configured to couple each corresponding latch element to the lateral member, to facilitate the rotation of each latch element,
    wherein each latch element of the plurality of latch elements includes a hook element that is configured to engage a corresponding bearing of the plurality of bearings and to apply a force that draws the first structure toward the second structure during the rotation of the latch element; and
    wherein each pinion includes a tang that engages an adjacent latch element to urge the adjacent latch element toward a latch position during the lateral movement of the lateral member.

2. The coupling device of claim 1, wherein each pinion of the plurality of pinions is pivoted about a bearing mounted on the second structure.

3. The coupling device of claim 2, wherein:
the lateral member includes a first gear surface, and
each pinion includes a second gear surface that is configured to engage the first gear surface, to thereby provide a rotation of the pinion during the lateral movement of the lateral member.

4. The coupling device of claim 2, wherein each pinion is coupled to each corresponding latch element by a roller bearing.

5. The coupling device of claim 1, wherein the latch elements are configured such that, upon coupling with the bearings, lateral forces on the lateral member are substantially nil.

6. The coupling device of claim 1, wherein
the first and second structures each include two lateral side walls,
the bearings extend between the side walls of the first structure,
the latch elements and the lateral member are contained within the side walls of the second structure, and
the side walls of the first structure abut the side walls of the second structure when the latch elements are coupled with the bearings.

7. The coupling device of claim 6, wherein the side walls of the first structure and the side walls of the second structure are joined in compression when the latch elements are coupled with the bearings.

8. The coupling device of claim 1, wherein the second structure includes a ball-bearing track within which the lateral member travels.

9. The coupling device of claim 1, including a motor assembly that is configured to provide the lateral movement to the lateral member.

10. The coupling device of claim 9, wherein the motor assembly includes:
one or motors that are configured to turn a ball screw; and
a ball nut assembly, rotatably attached to the ball screw, that is coupled to the lateral member by a link element, and is configured to extend the link element to provide the lateral movement as the ball screw is turned.

11. The coupling device of claim 1, wherein the latch elements and the bearings are configured so as to facilitate alignment of the first and second elements as the latch elements are engaged with the bearings.

12. A system comprising:
a first element that includes a first structure that includes a plurality of transverse-mounted bearings;
a second element that includes a second structure that includes:
a plurality of latch elements that are configured to engage the plurality of bearings via a rotation of the latch elements,
a lateral member that is configured to provide the rotation of the latch elements via a lateral movement of the lateral member, and
a plurality of pinions that are each configured to couple each corresponding latch element to the lateral member, to facilitate the rotation of each latch element,
wherein each latch element of the plurality of latch elements includes a hook element that is configured to engage a corresponding bearing of the plurality of bearings and to apply a force that draws the first structure toward the second structure during the rotation of the latch element; and
wherein the first and second elements include one of:
a spacecraft and a launch vehicle;
two stages of a launch vehicle;
two halves of a launch vehicle's fairings;
two modules of a space station;
two sections of a payload; and
two sections of a fuselage.

13. The system of claim 12, wherein each pinion of the plurality of pinions is pivoted about a bearing mounted on the second structure.

14. The system of claim 13, wherein:
the lateral member includes a first gear surface, and
each pinion includes a second gear surface that is configured to engage the first gear surface, to thereby provide a rotation of the pinion during the lateral movement of the lateral member.

15. The system of claim 13, wherein each pinion is coupled to each corresponding latch element by a roller bearing.

16. The system of claim 12, wherein each pinion includes a tang that is configured to urge an adjacent latch element toward a latch position during the lateral movement of the lateral member.

17. The system of claim 12, wherein
each of the first and second structures includes two lateral side walls,
the bearings extend between the side walls of the first structure,
the latch elements and the lateral member are contained within the side walls of the second structure, and
the side walls of the first structure abut the side walls of the second structure when the latch elements are coupled with the bearings.

18. The system of claim 17, wherein the side walls of the first structure and the side walls of the second structure are joined in compression when the latch elements are coupled with the bearings.

19. The system of claim 12, further including a motor assembly that is configured to provide the lateral movement to the lateral member.

20. The system of claim 19, wherein the motor assembly includes:
one or motors that are configured to turn a ball screw; and
a ball nut assembly that is coupled to the lateral member by a link element, and is configured to extend the link element to provide the lateral movement as the ball screw is turned.

* * * * *